(12) United States Patent
Banitt (10) Patent No.: US 12,364,259 B2
(45) Date of Patent: Jul. 22, 2025

(54) ROBOTIC SPRAYER FOR OPTIMIZING APPLICATION OF CROP RELATED MATERIALS (71) Applicant: RPerception Ltd, Modiln (IL)

(72) Inventor: Yoav Banitt, Modiln (IL)

(73) Assignee: RPerception Ltd, Modi'in (IL)

( * ) Notice: Subject to any disclaimer, the term of this patent is extended or adjusted under 35 U.S.C. 154(b) by 373 days.

(21) Appl. No.: 17/902,943

(22) Filed: Sep. 5, 2022

(65) Prior Publication Data
US 2024/0074425 A1  Mar. 7, 2024

(51) Int. Cl.
A01M 7/00 (2006.01)
B05B 12/12 (2006.01)

(52) U.S. Cl.
CPC .......... A01M 7/0089 (2013.01); B05B 12/122 (2013.01)

(58) Field of Classification Search
CPC .................................................. A01M 7/0089
See application file for complete search history.

(56) References Cited

U.S. PATENT DOCUMENTS

| 2011/0089258 A1* | 4/2011 | Pun ........................ B05B 3/10 239/214.23 |
| 2018/0052088 A1 | 2/2018 | Sarkar et al. |
| 2020/0011019 A1 | 1/2020 | Serrat et al. |
| 2022/0030845 A1* | 2/2022 | Grimm ............... A01M 7/0014 |
| 2022/0151216 A1 | 5/2022 | Stuber et al. |
| 2022/0245381 A1* | 8/2022 | Takla ..................... G06N 3/088 |
| 2023/0364630 A1* | 11/2023 | Jayaprakash ........... B05B 12/12 |

(Continued)

FOREIGN PATENT DOCUMENTS

| DE | 19530356 A1 | 4/1997 | |
| EP | 2957173 B1 * | 7/2017 | .......... A01M 7/0014 |

(Continued)

OTHER PUBLICATIONS

Kang et al. "An Automated Trailer Sprayer System for Targeted Control of Cutworm in Vineyards", Transactions of the ASABE, American Society of Agricultural and Biological Engineers, 54(4): 1511-1519, Jul. 2011.

(Continued)

Primary Examiner — Suresh Suryawanshi
(74) Attorney, Agent, or Firm — M&B IP Analysts, LLC (57) ABSTRACT A robotic sprayer for optimizing application of crop related materials, comprising one or more imaging sensors, one or more nozzles configured for spraying one or more materials, one or more actuators configured for moving the one or more nozzles, and one or more controllers. The controller(s) is configured for receiving imagery data captured by the imaging sensor(s) depicting one or more plants, computing a foliage model modeling a foliage of the plant(s) based on analysis of the imagery data, identifying, based on analysis of the foliage model, one or more access courses to one or more underlying parts of the plant(s) which are at least partially covered by the foliage, operating the actuator(s) to adjust in real-time a position of the nozzle(s) according to the access course(s), and operating the nozzle(s) to spray the material(s) over the underlying parts.

18 Claims, 3 Drawing Sheets (56) References Cited

U.S. PATENT DOCUMENTS

2023/0367295 A1* 11/2023 Jayaprakash ......... B05B 12/084

FOREIGN PATENT DOCUMENTS

WO     WO-2022094138 A1 *   5/2022   ......... A01M 7/0089
WO        2022128189 A1     6/2022

OTHER PUBLICATIONS

International Search Report for PCT/IB2023/058501, dated Nov. 19, 2023. Searching Authority Israel Patent Office, Jerusalem, Israel.
Written Opinion of the Searching Authority for PCT/IB2023/058501, dated Nov. 19, 2023. Searching Authority Israel Patent Office, Jerusalem, Israel.

* cited by examiner

ROBOTIC SPRAYER FOR OPTIMIZING APPLICATION OF CROP RELATED MATERIALS

FIELD AND BACKGROUND OF THE INVENTION

The present invention, in some embodiments thereof, relates to a robotic sprayer configured and operated to spray one or more materials on plants (crops), and, more specifically, but not exclusively, a robotic sprayer configured and operated to spray one or more materials on underlying parts of plants (crops) which are at least partially covered by foliage of the plants.

Modern agriculture makes use of a plurality of materials, for example, anti-pests, ant-herbicides, fertilizers and/or the like applied to crop plants for a plurality of applications, for example, protect the plants from pests, fungus, etc., increase crops' yield, improve quality of the crops' products, and more.

Major efforts are therefore invested in research and design of spraying technologies and equipment in attempt to effectively and efficiently accomplish these goals.

SUMMARY OF THE INVENTION

According to a first aspect of the present invention there is provided a robotic sprayer for optimizing application of crop related materials, comprising one or more imaging sensors, one or more nozzles configured for spraying one or more materials, one or more actuators configured for moving the one or more nozzles, and one or more controllers configured for: receiving imagery data captured by the one or more imaging sensors depicting one or more plants, computing a foliage model modeling a foliage of the one or more plants based on analysis of the imagery data, identifying, based on analysis of the foliage model, one or more access courses to one or more underlying parts of the one or more plants which are at least partially covered by the foliage, operating the one or more actuators to adjust in real-time a position of the one or more nozzles according to the one or more access courses, and operating the one or more nozzles to spray the one or more materials over the one or more underlying parts.

According to a second aspect of the present invention there is provided a method of adjusting automatically a robotic a robotic sprayer for optimizing application of crop related materials, comprising using one or more controllers of a robotic sprayer for: receiving imagery data depicting one or more plants which is captured by one or more imaging sensors of the robotic sprayer, computing a foliage model modeling a foliage of the one or more plants based on analysis of the imagery data, identifying, based on analysis of the foliage model, one or more access courses to one or more underlying part of the one or more plant which is at least partially covered by the foliage; operating the one or more actuators of the robotic sprayer to adjust in real-time a position of the one or more nozzles of the robotic sprayer according to the one or more access courses, and operating the one or more nozzles to spray one or more materials over the one or more underlying parts.

In an optional implementation form of the first and/or second aspects, the robotic sprayer comprises one or more air blowing devices. The one or more controllers are further configured for operating the one or more air blowing devices to produce an air flow directed to the foliage in one or more blasts to form one or more access courses to the one or more underlying parts.

In an optional implementation form of the first and/or second aspects, the one or more controllers are further configured for operating the one or more air blowing device based on analysis of the foliage model.

In an optional implementation form of the first and/or second aspects, the one or more controllers are further configured for operating one or more of the actuators to adjust the position of one or more of the nozzles according to a deposition of the one or more materials over the one or more underlying parts. The deposition is identified based on analysis of imagery data of the one or more plants captured by the one or more imaging sensors when sprayed with the one or more materials.

In an optional implementation form of the first and/or second aspects, the one or more controllers are further configured for operating one or more of the actuators to adjust the position of one or more of the nozzles using one or more machine learning models trained to learn a correlation between nozzle positioning and disposition of the one or more material over the one or more plant.

In a further implementation form of the first and/or second aspects, the one or more machine learning models are trained with a plurality of training samples associating between a plurality of positions of the one or more nozzles with respect to the one or more plants and coverage of the one or more materials over the one or more plants sprayed by the one or more nozzles while positioned in the plurality of positions.

In an optional implementation form of the first and/or second aspects, the robotic sprayer comprises one or more position sensors configured to measure a position of one or more of the nozzles with respect to one or more reference points of the robotic sprayer. The one or more controllers are further configured for operating one or more of the actuator to adjust the position of one or more of the nozzles according to nozzle position data captured by the one or more position sensors.

In a further implementation form of the first and/or second aspects, the one or more controllers are configured to operate the one or more actuators to adjust the position of the one or more nozzles according to one or more positioning rules which define: a distance, an orientation, an access angle, and/or the like.

In a further implementation form of the first and/or second aspects, the one or more controllers are configured to operate the one or more nozzles according to one or more spraying rules which define: a type of the one or more material, an amount of the one or more material, a spray pressure, a spray angle and/or the like.

In an optional implementation form of the first and/or second aspects, the one or more controllers are further configured for operating one or more of the actuators to adjust the position of one or more of the nozzle according to one or more environmental conditions.

In a further implementation form of the first and/or second aspects, the one or more nozzles are configured to spray the one or more materials using one or more spraying mechanisms. The one or more spraying mechanisms are members of a group consisting of: air pressure and/or hydraulic pressure.

In an optional implementation form of the first and/or second aspects, the robotic sprayer comprises one or more air spraying devices configured to further distribute the one or more materials sprayed by the one or more nozzles.

In a further implementation form of the first and/or second aspects, one or more properties of droplets of the one or more materials sprayed by the one or more nozzles are adjusted for enhanced distribution by the one or more air spraying devices.

In a further implementation form of the first and/or second aspects, the one or more controllers are configured for operating one or more of the actuators to adjust a position of one or more of the air spraying devices.

In an optional implementation form of the first and/or second aspects, the robotic sprayer comprises one or more light sources configured to project light on the one or more plants in one or more light spectral regions.

In a further implementation form of the first and/or second aspects, the one or more controllers are configured for operating one or more of the actuators to adjust a position of one or more of the light sources.

In a further implementation form of the first and/or second aspects, the one or more nozzles are mounted on one or more arm elements moveable by one or more of the actuators.

In a further implementation form of the first and/or second aspects, each of the one or more imaging sensors is a member of a group consisting of: a camera, an infrared sensor, a laser imaging detection and ranging (LiDAR) sensor, an ultrasonic sensor, a thermal imaging sensor, a sound navigation and ranging (SONAR) sensor, and/or a radio detection and ranging (RADAR) sensor.

In a further implementation form of the first and/or second aspects, each of the one or more materials is a member of a group consisting of: a fertilizer, an herbicide, and/or a pesticide.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a robotic sprayer configured and operated to spray one or more materials on plants (crops), and, more specifically, but not exclusively, a robotic sprayer configured and operated to spray one or more materials on underlying parts of plants (crops) which are at least partially covered by foliage of the plants.

According to some embodiments of the present invention, there are provided systems, methods and computer program products for operating and adjusting a robotic sprayer configured to spray one or more materials, for example, a pesticide, a fertilizer, an herbicide, and/or the like, on one or more plants (crops) planted in one or more growing areas, for example, a field, an orchard, a plantation, a vineyard, and/or the like.

In particular, the robotic sprayer, comprising one or more nozzles moveable by one or more actuators, may be configured and operated to spray the material(s) through the nozzle(s) on and/or over one or more underlying parts of the plants, for example, a stem, a trunk, inner leaves, and/or the like which are at least partially covered by foliage of the plants.

The nozzle(s) may be configured and/or operated to spray the spray material(s) in the form of a jet of droplets discharged (emitted, released) under pressure from the nozzle(s) using one or more technologies, methods, and/or implementations, for example, air pressure, hydraulic (liquid), pressure, a combination thereof, and/or the like.

The real-time adjustment of the robotic sprayer is done based on analysis of a foliage model modeling the foliage of the plants currently targeted for spraying which is created based on imagery data of the plants, for example, images, video streams, heat maps, ranging data, and/or the like captured by one or more imaging sensors of the robotic sprayer, for example, a camera, a video camera, an infrared (IR) sensor, a Laser Imaging Detection and Ranging (Li-DAR) sensor, an ultrasonic sensor, a thermal imaging sensor, a Sound Navigation and Ranging (SONAR) sensor, a Radio Detection And Ranging (RADAR) sensor and/or the like.

The foliage model may be analyzed to identify one or more access courses through which the spray material(s) may be sprayed such that its deposition and/or distribution over the underlying parts of the plants is estimated to be most efficient.

The actuator(s) of the robotic sprayers may be then operated to adjust the position of the nozzle(s) which may be attached, mounted, integrated and/or otherwise mechanically coupled to one or more moveable elements, for example, a mechanical arm element moveable by the actuator(s) in one or more axes with respect to the target plants.

After positioned according to the access course(s), the nozzle(s) may be operated to spray the spray material(s) such that the spray material(s) may distribute over the underlying parts of the plants.

Optionally one or more of the imaging sensors is also moveable by one or more of the actuators of the robotic sprayer such that a position of the imaging sensor(s) may be adjusted to improve visibility, quality, coverage, field of view, and/or the like of the captured imagery data which may be used to improve the foliage model.

Optionally, the robotic sprayer may comprise one or more air blowing devices (air blowers) configured to emit (blow) air blasts (bursts) in order to move, shift, bend, veer and/or the like the plants and/or part thereof, for example, their foliage (leafage) in attempt to expose one or more paths to one or more of the underlying parts of the plants. Moreover, one or more of the air blowing devices may be also moveable by one or more of the actuators of the robotic sprayer such that a position of the air blowing device(s) may be adjusted such that their air blasts may efficiently expose path(s) to the underlying parts of the plants.

Optionally, the robotic sprayer may be operated to adjust the position of the nozzle(s) based on analysis of distribution (results) of the spray material(s) over the plants, specifically over the underlying parts of the plants. The distribution may be identified, estimated, and/or determined based on imagery data of the plants captured by the imaging sensor(s) after the plants are sprayed with the spray material(s).

Optionally, the robotic sprayer may be operated to adjust the position of the nozzle(s) using one or more Machine Learning (ML) models trained to estimate, and/or predict one or more distribution patterns and/or outcome of the spray materials over plants, in particular over underlying parts of the plants. Specifically, the ML models may be trained to estimate, and/or predict one or more distribution patterns and/or outcome of the spray material(s) over the underlying parts in correlation to the position of the nozzle(s) with respect to the plants while spraying the spray material(s).

According to some embodiments of the present invention, the robotic sprayer may be configured to combine pressure based spraying (e.g., air pressure, hydraulic pressure, a combination thereof, etc.) through the nozzle(s) with air blowing technology to improve, increase, and/or enhance Spray deposition and distribution of the sprayed material(s) over the targeted plants.

The robotic sprayer may comprise one or more air spraying devices configured to produce one or more air flows, blows, blasts, and/or bursts over the pressurized jet of droplets discharged through the nozzle(s) thus forming a cloud of droplets created to further distribute the spray material(s) over the plants.

In order to efficiently create the cloud of droplets and increasing effectivity distribution of the droplets over the plants, one or more properties of the droplets of the jet discharged from the nozzle(s) may be adjusted, for example, size, diameter, weight, and/or the like. For example, the nozzle(s) may be designed, configured, adjusted and/or operated to form and/or produce droplets having one or more predefined size, diameter, and/or weight such that the droplets may be effectively blown (driven) by the air spraying device(s) to create the cloud of droplets which may enhance deposition and/or distribution of the droplets over the plants.

The foliage model based adjustment and operation of the robotic sprayer may present major benefits and advantages compared to existing agricultural related spraying methods and systems.

The existing methods may be highly limited in the ability to distribute and/or apply spray agricultural related materials over underlying parts of the plants which are covered by the foliage of the plants, in particular for dense foliage plants. In attempt to spray the underlying parts, most, if not all, of the existing methods may spray the entire plant such that at least some of the sprayed material will penetrate through the covering foliage and distribute over the underlying parts.

This approach of the existing agricultural spraying methods and systems may present major limitations and risks.

First, since only a small portion of the sprayed material is actually deposited and/or distributed over the underlying parts of the plants, increased volume of the material must be sprayed in order to ensure that a sufficient amount of spray material is distributed on the underlying parts.

Moreover, the material that needs to be sprayed on the underlying parts of the plants, for example, the stem, the trunk and/or the like may be hazardous, and/or harmful to the foliage of the plants and/or to its fruit, product, and/or the like. This threat may be dramatically increased due to the large doses and/or volume of material that is distributed over the foliage. In addition, in case the foliage and/or the fruit of the plant are produced for food to humans and/or animals, which is typically the case with agricultural crops, the high dose of spray material that is distributed over the foliage and/or the fruit may introduce health risks.

Using the robotic sprayer to spray the plants based on the foliage model may overcome these limitations of the existing spraying methods since the nozzle(s) of the robotic prayer may be positioned to effectively spray the spray material(s) directly and accurately on the underlying parts of the plants with very little and potentially insubstantial amount of material deposited and/or distributed over the foliage or other parts of the plants other than the underlying parts targeted by the robotic sprayer.

Therefore, since the spray material is accurately sprayed on the underlying parts of the plants, the overall amount and/or volume of the spray material that is required to effectively distribute a sufficient amount of the material on the underlying parts may be significantly reduced thus significantly reducing costs, time, and/or effort of the spray operation. Reducing the overall volume of spray material(s) that is sprayed over the plants may also significantly reduce environmental hazards and/or risks as well as health related risks due to exposure to the spray material(s) chemicals.

Moreover, the spray material is accurately sprayed directly on the underlying parts of the plants without significantly spraying other parts of the plants, for example, the foliage, the fruit, and/or the like. The risk, hazard and/or damage inflicted on these parts of the plants may be therefore significantly reduced and potentially eliminated. Also, health risks due to consumption of the other parts of the plants may be also significantly reduced and potentially eliminated due to the fact that these other parts are not sprayed with excessive and potentially harmful materials.

Furthermore, applying air blowers to form opening and access paths to the underlying parts of the plants through their foliage may significantly improve accuracy, efficiency and/or reliability of the spraying process.

In addition, adjusting the position of the imaging sensors and/or operating light source to illuminate the plants while capturing the imagery data of the plants may yield significantly improved, enhanced and/or clear imagery data which may be used to create an enhanced and improved foliage model. The enhanced foliage model may be used, in turn, to more efficiently identify reliable and effective access routes to the underlying parts of the plants which may further improve deposition and distribution of the spray material over them.

Also, combining pressure based nozzles producing a pressurized jet of droplets of the spray material with air blowing devices configured to produce air flows over the jet and form a cloud of droplets may significantly increase efficiency of the distribution of the spray material over the plants while reducing costs, effort and/or time.

First, since the pressurized jet is converted to a cloud of droplets, the pressure required for producing the jet may be significantly reduced compared to the pressure applied by the existing methods which must be much higher in order to effectively deposit and/or distribute over the plants. As such the robotic sprayer may be equipped with a significantly smaller and lower-cost compressor which is highly more mobile thus significantly reducing costs of the robotic sprayer and/or it's carrying vehicle since they may be significantly smaller and more cost effective.

Moreover, due to their smaller form factor, the robotic sprayer with its carrying vehicle may be highly more dynamic, compact and/or agile compared to the existing sprayers thus making it highly suitable for spraying in areas which are challenging in terms of accessibility, for example, orchards, vineyards, and/or other specialty crops in which the maneuvering space is limited.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
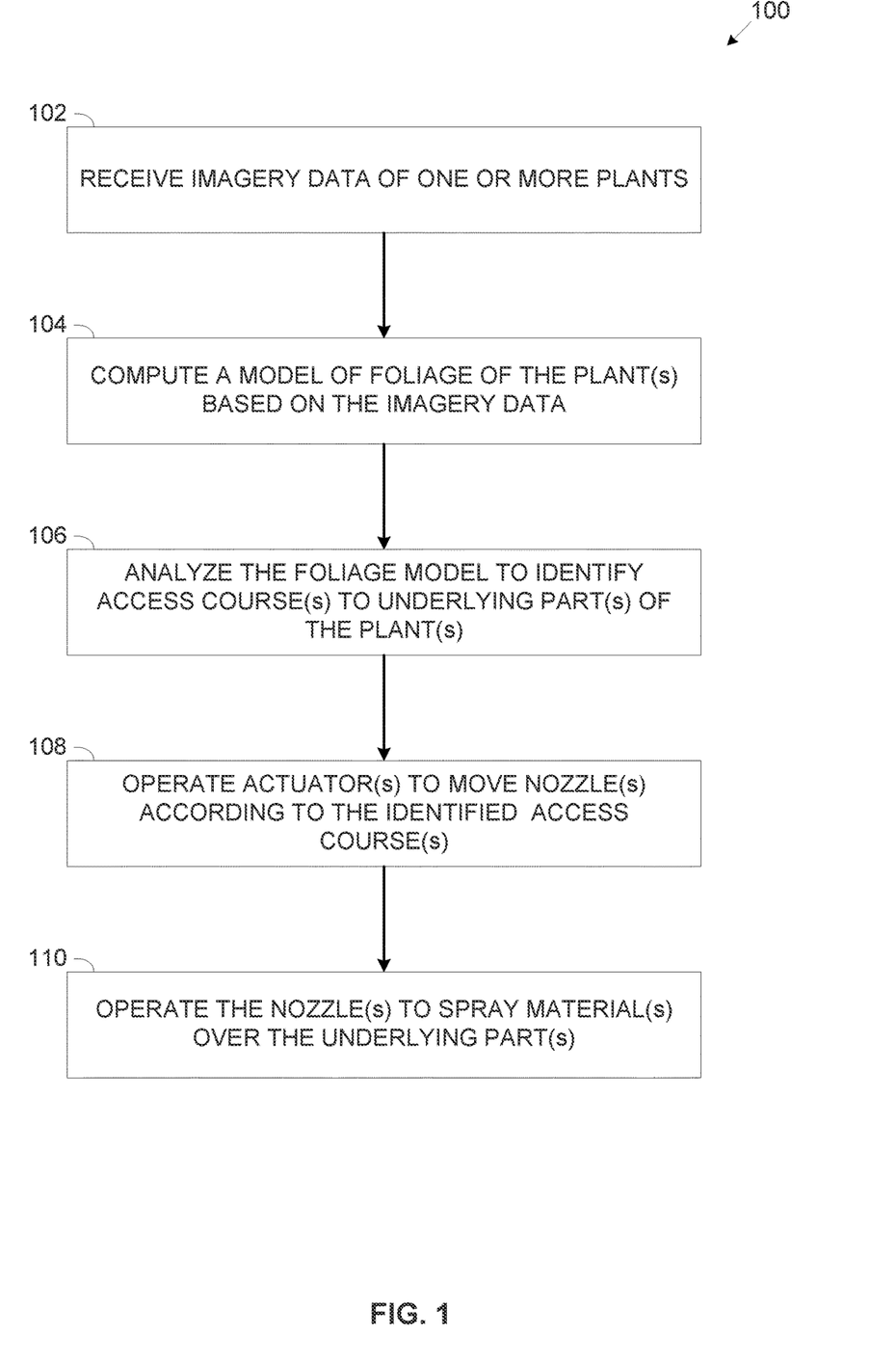
FIG. 1 is a flowchart of an exemplary process of operating a robotic sprayer to spray one or more materials on underlying parts of plants which are at least partially covered by foliage of the plants, according to some embodiments of the present invention.

Referring now to the drawings, FIG. 1 is a flowchart of an exemplary process of operating a robotic sprayer to spray one or more materials on underlying parts of plants which are at least partially covered by foliage of the plants, according to some embodiments of the present invention.

An exemplary process 100 may be executed to operate a robotic sprayer configured to spray one or more materials, for example, a pesticide, a fertilizer, an herbicide, and/or the like, on one or more plants (crops) planted in one or more growing areas, for example, a field, an orchard, a plantation, a vineyard, and/or the like.

In particular, the robotic sprayer, comprising one or more nozzles moveable by one or more actuators, may be configured and operated to spray, via the nozzle(s), the material(s) on one or more underlying parts of the plants which are at least partially covered by foliage of the plants, for example, a stem, a trunk, inner leaves, and/or the like.

A model of the plant(s)' foliage may be created based on imagery data, for example, images, video streams, distance maps, imaging maps, and/or the like captured by one or more imaging sensors associated with the robotic sprayer which are configured to monitor foliage of the plants targeted by the robotic sprayer.

The model may be analyzed to identify one or more possible access routes to the underlying part(s) and one or more of the robotic sprayer's actuator(s) may be operated to position, orient, rotate, and/or otherwise move the nozzle(s) accordingly to one or more of the identified access route(s), for example, optimal access route(s) estimated to yield best deposition and/or distribution of the sprayed material on the plant(s)' underlying part(s).

Optionally, the nozzle(s) may be operated to further improve, enhance, and/or expand distribution of the sprayed material on the plant(s)' underlying part(s).

Figure 2A:
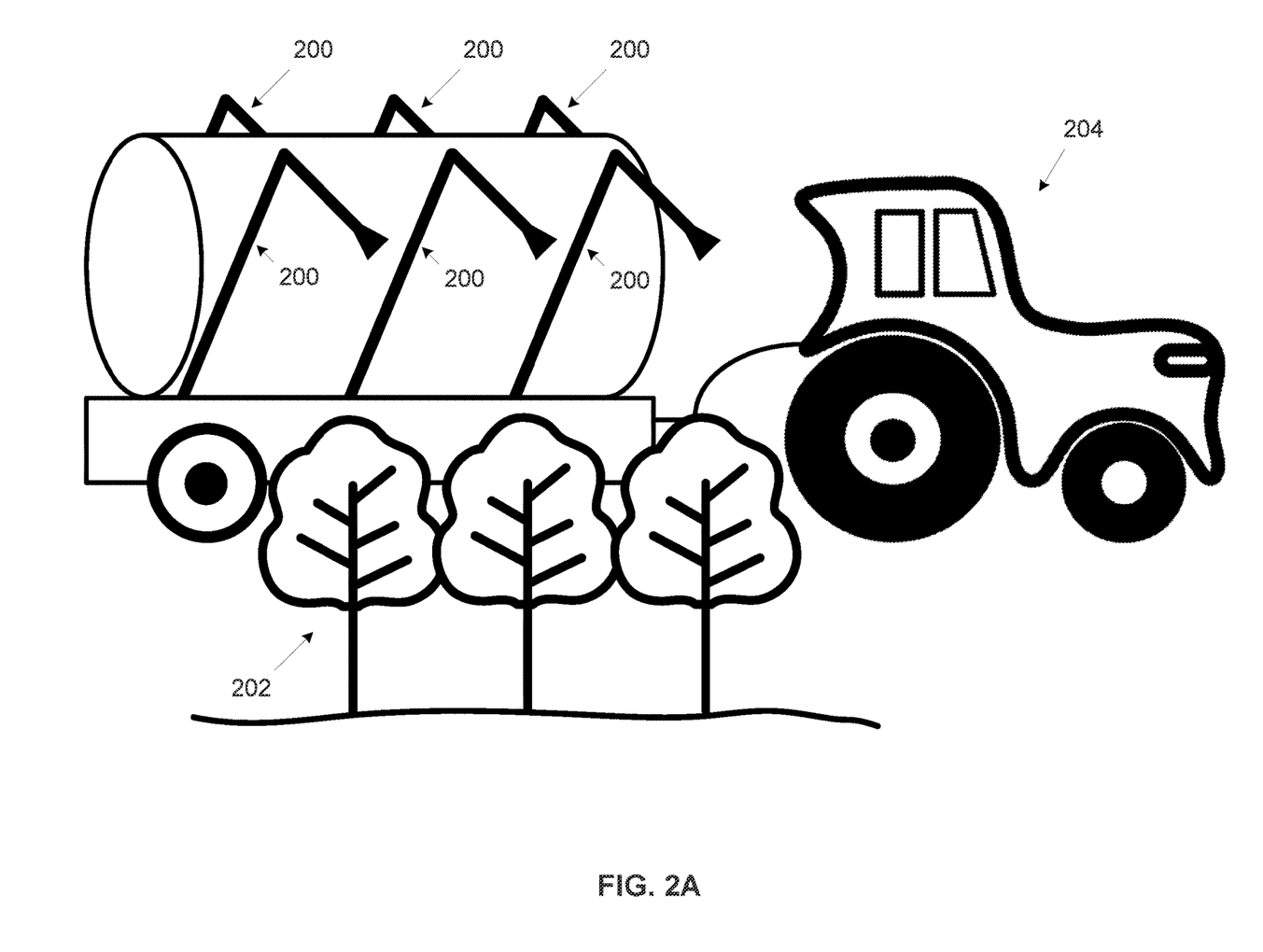
FIG. 2A and FIG. 2B are schematic illustration of an exemplary robotic sprayer configured to spray one or more materials on underlying parts of plants which are at least partially covered by foliage of the plants, according to some embodiments of the present invention.
Figure 2B:
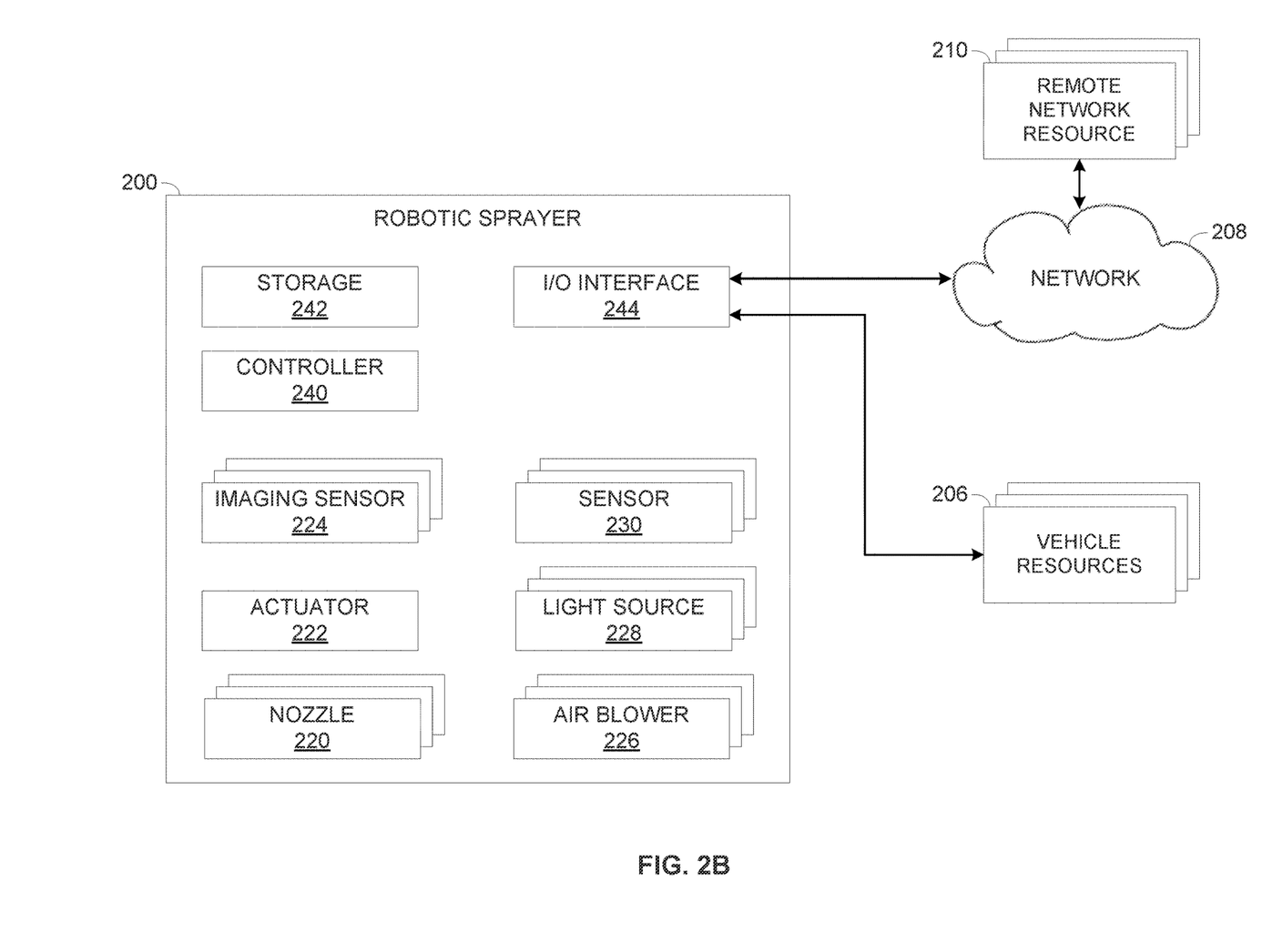

Reference is also made to FIG. 2A and FIG. 2B, which are schematic illustration of an exemplary robotic sprayer configured to spray one or more materials on underlying parts of plants which are at least partially covered by foliage of the plants, according to some embodiments of the present invention.

As seen in FIG. 2A, an exemplary robotic sprayer 200 may be configured to spray one or more materials, for example, a pesticide, a fertilizer and/or the like, on one or more plants 202 (crops) planted in one or more growing areas, for example, a field, an orchard, a plantation, a vineyard, and/or the like.

The robotic sprayer 200 may be mounted, attached, integrated, carried, seated and/or otherwise mechanically coupled to one or more vehicles 204 configured to move (travel) in the growing area such that while the vehicle 204 moves through the growing area, the robotic sprayer 200 may spray one or more of the materials over the plants 202, in particular, on the underlying part(s) of the plant(s) 202.

The robotic sprayer 200 may be typically coupled to one or more land vehicles 204, for example, agricultural vehicles and/or machinery configured to move in the growing area, for example, a sprayer, a tractor, a trailer hauled (e.g., dragged, pulled, pushed, etc.) by another vehicle, a combine, and/or the like. For example, the robotic sprayer 200 may be coupled to a land vehicle 204 which moves between rows of plants, for example, trees, bushes, vines, and/or the like such that the robotic sprayer 200 may be operated to spray one or more of the spray materials on the plants 202 as the vehicle 204 moves in their proximity.

Optionally, the robotic sprayer 200 may be coupled to one or more aerial vehicles 204, for example, a drone, an Unmanned Aerial Vehicle (UAV), and/or the like which may be configured and operated to fly at low altitude and low speed in order to enable accurate spraying of the material(s) by the robotic sprayer 200.

As seen in FIG. 2B, the robotic sprayer 200 may include one or more nozzles 220 configured to spray (i.e., emit, discharge, eject, etc.) one or more of the (spray) materials which may be sprayed (discharged, released) via the nozzle(s) 220 under pressure in the form of a jet of droplets.

The nozzle(s) 220 may be configured, adapted and/or operated to apply one or more spraying technologies, methods, and/or techniques as known in the art for spraying the material(s), for example, hydraulic pressure (liquid pressure) based spraying, air pressure based spraying, a combination thereof, and/or the like.

Each nozzle 220 may be moveable such that it may be positioned, oriented, rotated, and/or otherwise moved by one or more actuators 222 in order to set, adjust, and/or define the direction of the flow(s) of the material(s) sprayed through the nozzle 220.

The nozzles 220 may be independent of each other such that each nozzle 220 may be moveable separately of the other nozzles 220. For example, one or more of the nozzles 220 may be mechanically coupled, for example, attached, mounted, carried, and/or the like to one or more mechanical arm elements which are moveable, rotatable, extendable, and/or the like in one or more spatial axes (for example, x, y, and/or z axes in a Cartesian coordinate system) by the actuator(s) 222 thus enabling movement of their attached nozzle(s) 220.

However, in some configurations multiple nozzles 220 may be mounted a common mechanical element, for example, a bar, in particular, a moveable bar such that moving the bar may move all nozzles 220 coupled to the bar. Optionally, while moved together, at least to some degree, the multiple nozzles 220 attached to the moveable bar may be each moveable separately independently of the other nozzle(s) 220 attached to the same bar such that each nozzle 220 may have some degree of independent movement.

The robotic sprayer 200 may include one or more imaging sensors 224, for example, a camera, a video camera, an IR sensor, a LiDAR sensor, an ultrasonic sensor, a thermal imaging sensor, a SONAR sensor, a RADAR sensor, and/or the like configured to capture imagery data. The imagery data may depend on the type of the sensor and may include, for example, images, video streams, heat maps, ranging data, and/or the like of the environment of the robotic sprayer 200, for example, imagery data of the plant(s) 202 targeted for spraying by the robotic sprayer 200.

Moreover, one or more of the imaging sensor(s) 224 may be optionally moveable by one or more of the actuator(s) 222 of the robotic sprayer 200 which may be operated to adjust position of the imaging sensor(s) 224 in order to change, adjust, and/or adapt one or more of their imagery capture parameters, for example, a viewpoint, a field of view, a distance, a focus, and/or the like. For example, one or more of the imaging sensor(s) 224 may be mechanically coupled (e.g., attached, mounted, carried, etc.) to one or more mechanical arm elements which are moveable, rotatable and/or extendable in one or more spatial axes by one or more of the actuator(s) 222 thus enabling movement of their attached imaging sensor(s) 224.

Optionally, the robotic sprayer 200 may comprise one or more air blowing devices 226 (air blower) configured to produce (emit, eject, etc.) air flows and/or bursts of air at high pressure. In particular, the air blowing device(s) 226 may be configured and/or operated to produce air flow in order to move, shift, bend, veer and/or the like one or more of the plant(s) 202 and/or part thereof, for example, its foliage (leafage) in attempt to expose a path to one or more of the underlying parts of the plant(s) 202.

Moreover, one or more of the air blowing device(s) 226 may be optionally moveable by one or more of the actuator(s) 222 of the robotic sprayer 200 which may be operated to adjust position of the air blowing device(s) 226 in order to change, adjust, and/or adapt the direction of the flow of air coming out of the air blowing device(s) 226. For example, one or more of the air blowing device(s) 226 may be mechanically coupled to one or more mechanical arm elements which are moveable, rotatable and/or extendable in one or more spatial axes by one or more of the actuator(s) 222 thus enabling movement of their attached air blowing device(s) 226.

Optionally, the robotic sprayer 200 may comprise one or more light sources 228, for example, a lamp, an illumination device, and/or the like configured to project (e.g. emit, illuminate, etc.) light to the environment of the robotic sprayer 200, for example, to illuminate the plant(s) 202 targeted for spraying by the robotic sprayer 200 in order to increase their visibility and improve the imagery data captured by one or more of the imaging sensor(s) 224. The light source(s) 228 may configured and/or operated to project light according to one or more illumination parameters, for example, light strength (i.e., light level, measured for example, in lumens), light beam width (which may define an illumination area), spectral region (e.g., visible light, IR, Ultra-Violet (UV), etc.), and/or the like.

Moreover, one or more of the light source(s) 228 may be optionally moveable by one or more of the actuator(s) 222 of the robotic sprayer 200 which may be operated to adjust position of the light source(s) 228 in order to change, adjust, and/or adapt the illumination beam(s) projected by the light source(s) 228. For example, one or more of the light source(s) 228 may be mechanically coupled to one or more mechanical arm elements which are moveable, rotatable and/or extendable in one or more spatial axes by one or more of the actuator(s) 222 thus enabling movement of their attached light source(s) 228.

Optionally, multiple elements of the robotic sprayer 200 may be moveable together at least to some extent. For example, one or more nozzles, 220, one or more imaging sensors 224, one or more air blowing devices 226 and/or one or more light sources 228 may be mounted and/or coupled to the same moveable mechanical element, for example, a common arm element. In such case, moving the common arm element may move all the elements coupled to it. Optionally, one or more of the elements coupled to the common arm element may be further moveable independently from the other elements, for example, rotated, oriented, positioned, extended, and/or the like.

Optionally, the robotic sprayer 200 may comprise one or more sensors and/or measurement devices 230 which may be configured to capture position and/or proximity data which may be used to measure and/or compute position (e.g., distance, location, orientation, etc.) of one or more elements of the robotic sprayer 200 with respect to one or more reference objects and/or elements, for example, a frame of the robotic sprayer 200, a mechanical feature (e.g., mark, bar, etc.) specifically embedded in the robotic sprayer 200 for positon reference, and/or the like. For example, the robotic sprayer 200 may include one or more position sensors which may be deployed and configured to measure a position of one or more of the nozzles 220. In another example, the robotic sprayer 200 may include one or more proximity sensors configured to measure a distance of one or more elements of the robotic sprayer 200, for example, a nozzle 220, an imaging sensor 224, an air blowing device 226, a light source 228, and/or the like with from one or more other objects, for example, one or more plants 202, one or more reference points of the robotic sprayer 200, and/or the like.

The robotic sprayer 200 further comprises one or more controllers 240 (designated controller 240 herein after) configured to operate the robotic sprayer 200, for example, the nozzle(s) 220, the actuator(s) 222, the imaging sensor(s) 224, the air blowing device(s) 226, the light source(s) 228, and/or the sensor(s) 230. In particular, the controller 240 may be configured to execute the process 100 for operating the robotic sprayer 200 to optimize application of one or more of the spray materials over one or more plants 202.

The controller 240 may comprise one or more processors and/or controllers optionally arranged for parallel processing, as clusters and/or as one or more multi core processor(s). The controller 240 may be configured to execute one or more software modules, for example, a process, a script, an application, an agent, a utility, a tool, an Operating System (OS), a service, a plug-in, an add-on and/or the like.

The robotic sprayer 200 may therefore include a storage 242 comprising one or more non-transitory storage devices, for example, persistent (non-volatile) memory devices (e.g., ROM, Flash, hard drive, etc.) and/or volatile memory devices (e.g., RAM, cache memory, etc.). The controller 240 may execute one or more of the software modules each comprising a plurality of program instructions stored in a non-transitory medium (program store) such as the storage 242 and executable by one or more processors such as the controller 240.

The controller 240 may further include, integrate and/or utilize one or more hardware modules (elements), for example, a circuit, a component, an Integrated Circuit (IC), an Application Specific Integrated Circuit (ASIC), a Field Programmable Gate Array (FPGA), a Digital Signals Processor (DSP) and/or the like.

The controller 240 may execute the process 100 using one or more software modules, one or more of the hardware modules and/or a combination thereof.

It should be noted that the steps of the process 100 executed by the controller 240 may be executed by any of one or more processors and/or controllers of the controller 240 and/or its hardware elements such that any processor and/or hardware element of the controller 240 may execute the process 100 and/or part thereof or optionally not participate in execution of the process 100.

The robotic sprayer 200 may optionally include an Input/Output (I/O) interface 244 for connecting and communicating with one or more external devices, systems, and/or resources.

For example, the I/O interface 244 may comprise one or more wired and/or wireless interfaces, for example, a Universal Serial Bus (USB) interface, a serial interface, a Radio Frequency (RF) interface, a Bluetooth interface and/or the like. Via the I/O interface 244, the robotic sprayer 200, specifically the controller 240 may connect and communicate with one or more vehicle resources 206, for example, a device, a system, a platform, and/or the like locally deployed in the vehicle 204 carrying the robotic sprayer 200.

Moreover, optionally, one or more of the elements of the robotic sprayer 200, for example, an imaging sensor 224, a light source 228, and/or a sensor 230 may not be an inherent and/or an integral part of the robotic sprayer 200 but may rather be separate devices deployed in the vehicle 204 optionally for other uses and/or application other than spraying the spray material(s). In such case, the robotic sprayer 200, specifically the controller 240 may communicate these devices and operate them according to the process 100 for automatically adjusting the robotic sprayer 200 to optimize application of the spray material(s) over the plant(s) 202.

In another example, the I/O interface 244 may comprise one or more network interfaces, in particular wireless network interfaces for connecting to a network 208 comprising one or more wireless networks, for example, a Wireless Local Area Network (WLAN, e.g., Wi-Fi), a cellular network, and/or the like. Via the I/O interface 244, the robotic sprayer 200, specifically the controller 240 may connect and communicate with one or more remote resources 210, for example, a server, a cloud service, a database, and/or the like to retrieve and/or transmit data relating to the process 100 and the application of the spray material(s) over the plant(s) 202.

For brevity, the process 100 is presented and described for automatically adjusting a single nozzle 220 of the robotic sprayer 200 to spray a single spray material over a single plant 202. This, however, should not be construed as limiting since, as may become apparent to a person skilled in the art, the process 100 may be easily expanded and/or extended for automatically adjusting a plurality of nozzles 220 of the robotic sprayer 200 to spray one or more spray materials over a plurality of plants 202.

As shown at 102, the process 100 starts with the controller 240 receiving imagery data of the plant 202 captured by one or more of the imaging sensors 224.

The imaging sensor(s) 224 deployed and configured to monitor and capture imagery data of the environment of the robotic sprayer 200, may thus capture imagery data of one or more plants 202 in the vicinity of the robotic sprayer. In particular, the imaging sensor(s) 224 may capture imagery data of plants 202 which are in the spraying range of the robotic sprayer 200 and are targeted by the robotic sprayer 200.

As stated herein before, the received imagery data may include, for example, images, video streams, heat maps, ranging data, and/or the like depending on the technology, capturing capabilities and/or operational parameters of the imaging sensor(s) 224.

Optionally, the controller 240 may operate one or more of the air blowing devices 226 to produce air flows, specifically a pressurized air flow, blow, blast and/or burst on the plant 202, in one or more air continuous and/or time limited air blasts in attempt to form and/or create one or more openings in the foliage of the plant 202 thus creating one or more paths to one or more of the underlying parts of the plant 202.

Optionally, the controller 240 may operate one or more of the light sources 228 to project light and illuminate at least part of the plant 202 while the imaging sensor(s) 224 capture the imagery data of the plant 202 in order to improve visibility of the plant 202 and it foliage in the captured imagery data.

As shown at 104, the controller 240 may compute, in real-time, a model of the plant 202 based on the received imagery data of the plant 202. In particular, based on analysis of the imagery data, the controller 240 may compute a foliage model of the plant 202 modeling a foliage (leafage) of the plant 202.

The controller 240 may apply one or more image analysis (visual analysis) methods, techniques and/or algorithms, for example, computer vision, image processing, machine learning based image classification, and/or the like to analyze the imagery data and identify visual features of the foliage of the plant 202.

Based on the visual features of the plant 202, the controller 240 may then compute the foliage model, for example, a two dimensions (2D) model, a three dimensions (3D) model, a combination thereof, and/or the like which may express, visualize, and/or describe the foliage of the plant 202, for example, distribution of leaves, density of the leaves, leaf structure, leaf size, and/or the like.

As shown at 106, the controller 240 may analyze the foliage model to identify one or more access courses to one or more underlying parts of the plant 202, for example, a stem, a trunk, a branch, inner leaves, and/or the like which are at least partially covered by the foliage of the plant 202.

For example, based on analysis of the foliage model, the controller 240 may identify one or more openings in the foliage of the plant 202 through which at least part of one or more underlying parts of the plant 202 may be seen. In such case, the controller 240 may identify one or more access routes to the underlying part(s) through the identified opening(s).

In another example, based on analysis of the foliage model, the controller 240 may identify one or more sections of the foliage in which density of the leaves is significantly low compared to other sections. In such case, the controller 240 may estimate that one or more of the underlying parts of the plant 202 may be accessible via the thinly dispersed leaves and may identify one or more access routes targeting the leaves low density section(s).

Optionally, the controller 240 may operate one or more of the air blowing devices 226 based on analysis of the foliage model computed for the plant 202 to create and/or form one or more access courses to one or more of the underlying parts of the plant 202. Moreover, since the air blowing device(s) 226 may be moveable, for example, mounted on one or more arm elements which are moveable by one or more of the actuators 222, the controller 240 may operate the actuator(s) 222 to move and/or adjust a position, for example, position, location, orientation, rotation and/or the like of the air blowing device(s) 226 based on analysis of the foliage model to create one or more access courses to one or more of the underlying parts of the plant 202.

For example, based on analysis of the foliage model, the controller 240 may identify a certain section in the foliage where the leaves' density is significantly low. In such case, the controller 240 may operate the air blowing device(s) 226 to produce an air flow in one or more blasts on the low density foliage section in order to form an opening in the foliage and thus creating an access course to the underlying part(s) of the plant 202. Moreover, before operating the air blowing device 226, the controller 240 may first operate the actuator(s) 222 to move the air blowing device(s) 226 and bring it to a location in which the air blowing device(s) 226 is estimated to have improved and/or optimal effect in creating opening(s) in the foliage and forming access course(s) the underlying part(s) of the plant 202.

In another example, based on analysis of the foliage model, the controller 240 may identify, determine, and/or estimate that one or more underlying part of the plant 202 are located at a certain location beneath the leaves of the plant 202. In such case, the controller 240 may operate the air blowing device(s) 226, optionally after operating the actuator(s) 222 to adjust the position of the air blowing device(s) with respect to the certain location, to produce an air flow directed to the foliage at the certain location in order to form an opening in the foliage and thus creating an access course to the underlying part(s) of the plant 202.

Optionally, based on analysis of the foliage model, the controller 240 may move and/or adjust the position of one or more of the imaging sensors 224 and operate them to capture additional, potentially improved, imagery data which may be used to update the foliage model and enhance it. In particular, since one or more of the imaging sensor(s) 224 may be moveable, for example, mounted on one or more arm elements which are moveable by one or more of the actuators 222, the controller 240 may operate the actuator(s) 222 to move and/or adjust the position of the air imaging sensor(s) 224 based on analysis of the foliage model to capture additional imagery data.

For example, assuming that based on analysis of the foliage model, the controller 240 identifies one or more sections of the foliage of the plant 202 which are not properly and/or sufficiently accurate modeled in the foliage model. In such case, the controller 240 may adjust the position of the imaging sensor(s) 224 to change its view angle, distance, perspective and/or the like with respect to the insufficiently modeled section(s) and operate the imaging sensor(s) 224 to capture additional imagery data of these section(s) which may be used for re-computing and enhancing the foliage model.

Optionally, the controller 240 may move and/or adjust the position, of one or more of the air blowing devices 226 based on analysis of the foliage model in attempt to better position the air blowing devices 226 such that their air flow may more efficiently form and/or create one or more access courses to one or more of the underlying parts of the plant 202 through its foliage. For example, assuming that based on analysis of the foliage model, the controller 240 identifies a certain section of the plant 202 under which one or more underlying parts are located. In such case, the controller 240 may operate one or more of the actuator(s) 222 to adjust the position of the air blowing devices 226 accordingly with respect to the certain section in attempt to form a path to the underlying part(s).

Optionally, the controller 240 may move and/or adjust the position, of one or more of the light sources 228 based on analysis of the foliage model and further operate one of more of the imaging sensors 224 to capture additional, potentially improved, imagery data of the plant 202 which may be used for re-computing and enhancing the foliage model. In particular, since one or more of the light source(s) 228 may be moveable, for example, mounted on one or more arm elements moveable by one or more of the actuators 222, the controller 240 may operate the actuator(s) 222 to move and/or adjust the position of the light source(s) 228 based on analysis of the foliage model to illuminate the plant 202 from the adjusted location.

As shown at 108, the controller 240 may operate one or more of the actuator(s) 222 to adjust, in real-time, the position of the nozzle 220 according to one or more of the access routes identified based on the analysis of the foliage model.

In particular, the controller 240 may operate the actuator(s) 222 to adjust the position of the nozzle 220 (e.g., position, location, orientation, rotation, etc.) to direct the nozzle 220 with respect to the plant 202 according to the access route(s) from which it is estimated that the spray material sprayed through the nozzle 220 may be effectively applied over the underlying part(s) of the plant 202.

For example, assuming a certain access route to one or more of the underlying parts of the plant 202 is identified in the foliage model though an opening in the foliage of the plant 202, a natural opening and/or an opening formed by the air blowing device(s) 226. In such case, the controller 240 may operate the actuator(s) 222 to adjust the position of the nozzle 220 to place a spraying opening of the nozzle 220 in front of the opening.

Moreover, the controller 240 may operate the actuator(s) 222 to adjust the position of the nozzle 220 according to one or more positioning rules which define one or more position parameters for the nozzle 220, for example, a distance, an orientation, an access angle, and/or the like. For example, a certain positioning rule may define a minimum distance of the nozzle 220 from the underlying part of the plant 202 targeted for spraying by the nozzle 220. In another example, a certain positioning rule may define the access angle according to type of the spray material since different spray materials may have different dispersal and/or diffusion characteristics and/or patterns (through the air).

Optionally, the controller 240 may adjust the position of one or more of the nozzle 220 according to nozzle position data captured by one or more of position sensors, for example, a position encoder, an imaging sensor, and/or the like deployed in the robotic sprayer 200 and/or its carrying vehicle 204 which are configured to measure a relative and/or absolute position of the nozzle 220 with respect to one or more reference points of the robotic sprayer 200 and/or the vehicle 204.

The reference points may comprise, for example, one or more inherent and/or integral features of the robotic sprayer 200, for example, a frame, a bar, a robotic arm element, and/or the like. In another example, the reference points may comprise one or more mechanical features specifically embedded, mounted, and/or attached to the robotic sprayer 200 for positon reference, for example, a reference mark, a reference bar, and/or the like. For example, a certain position sensor, deployed in the robotic sprayer 200 may be configured to measure a relative position of a certain nozzle 220 with respect to a base of a mechanical arm element on which the certain nozzle 220 is mounted. In such case, the controller 240 may compute the position of the certain nozzle 220 based on the known location (position) of the mechanical arm element's base and the position (data) measured by the certain position sensor.

The position sensors may employ one or more technologies, algorithms and/or methods. For example, a certain position sensor may employ one or more position encoders configured to measure the position, for example, distance of one or more of the nozzles 220 from one or more reference points. In another example, the position sensors may rely on one or more imaging sensors such as the imaging sensors 220 monitoring and depicting one or more of the nozzles 220 and one or more reference points. Based on visual analysis of one or more images captured by such imaging sensor(s), the controller 240 may compute the position, for example, distance, orientation, etc., of the nozzle(s) with respect to the reference points.

Optionally, the controller 240 may adjust the position of one or more of the nozzle 220 according to one or more environmental conditions identified during the spraying process of the spray material, for example, temperature, humidity, wind, precipitation (e.g., rain, snow, etc.), and/or the like. For example, assuming the controller 240 identifies strong wind in a certain direction (vector), the controller 240 may adjust the position of one or more of the nozzle 220 such that when spraying the spray material, the spray material is sprayed in the certain direction, i.e., with the wind rather than against the wind. In another example, assuming the controller 240 identifies rain conditions in the growing area targeted for spraying. In such case, the controller 240 may adjust the position of one or more of the nozzle 220 to move further into the foliage so that the sprayed material is less and potentially not exposed to the rain which may wash it off the plant 202.

Optionally, the controller 240 may also adjust one or more of the spraying parameters of the nozzle 220 and/or one or more properties of the sprayed material according to one or more of the environmental conditions identified during the spraying process. For example, in case of a higher temperature and low humidity environment, the controller 240 may configure and/or operate the nozzle 220 to increase a size of the droplets discharged in the pressurized in order to prevent early evaporation of the spray material distributed on the plant 202.

One or more of the environment conditions may be identified, for example, based on sensory data captured by one or more environment sensors deployed in the robotic sprayer 200 and/or in its carrying vehicle 204. In another example, one or more of the environment conditions may be identified based on information received from one or more remote network resources 210, for example, an online weather service, an environmental conditions monitoring station, and/or the like.

As shown at 110, after the nozzle 220 are positioned according to the access route(s), the controller 240 may operate one or more of the nozzle 220 to spray the spray material, for example, a pesticide, a fertilizer, an herbicide, and/or the like over one or more of the underlying parts of the plant 202 which are at least partially covered by the foliage of the plant 202, i.e., by leaves of the plant 202.

For example, the controller 240 may operate the nozzle 220 to spray an antifungal material on a trunk of a vine which is at least partially covered by the foliage of the vine. In another example, the controller 240 may operate the nozzle 220 to spray an anti-pest material on a stem and/or one or more branches of a vegetable bush which are at least partially covered by the bush's foliage.

The controller 240 may optionally operate the nozzle 220 to spray the spray material according to one or more spraying rules which define one or more spraying parameters for the nozzle 220, for example, a type of the spray material, an amount of spray material, a spray pressure, a spray angle, and/or the like. For example, assuming the nozzle 220 are configured to spray two types of materials, for example, a pesticide and a fertilizer stored in two separate tanks carried by the vehicle 204. In such case, a certain spraying rule may define spraying the two materials in a certain order, for example, first spray the pesticide followed by spraying the fertilizer. In another example, a certain spraying rule may define a respective spray pressure for each type of spray material since different spray materials may have different dispersal and/or diffusion characteristics and/or patterns (through the air). In another example, a certain spraying rule may define the spray angle, i.e., the opening angle of the nozzle 220, depending on the type of the target plant 202. For example, the spraying rule may define a wide spray angle for a plant 202 having relatively thin foliage through which the spray material may easily penetrate to distribute over the underlying part(s) of the plant 202. On the other hand, the spraying rule may define a narrower (smaller) spray angle for a plant 202 having a dense foliage where the flow of spray should be directed to specific section and/or opening in the foliage in order to effectively penetrate it and reach the underlying part(s).

Optionally, the controller 240 may operate one or more of the actuator 220 to adjust the position of one or more of the nozzle 220 according to a disposition and/or distribution (result) of the spray material after sprayed in order to apply it over one or more of the underlying parts of the plant 202 targeted by the nozzle 220.

To this end, the controller 240 may collect imagery data (e.g., image(s), video frame(s), heat map(s), etc.) depicting the plant 202 which is captured by one or more of the imaging sensors 224 after the spray material(s) is sprayed through the nozzle 220 in attempt to apply the spray material(s) over the underlying part(s) of the plant 202. The controller 240 may analyze the imagery data using image analysis to identify the disposition and/or distribution of the spray material on the plant 202, in particular, over the underlying parts of the plant 202 targeted by the nozzle 220.

Based on the analysis of the spray material disposition and/or distribution on the plant 202 and/or its underlying part(s), the controller 240 may further adjust the position of the nozzle 220 by operating the actuator(s) 222 accordingly, and after positioned, operate the nozzle 220 to spray the plant 202 again, specifically spray the underlying part(s). For example, assuming that based on analysis of the imagery data captured post spraying, the controller identifies, determines and/or estimates that one or more regions of the underlying part(s) of the plant 202 are sprayed with an insufficient amount of spray material. In such case, the controller 240 may operate the actuator(s) 222 to adjust the position of the nozzle 220 and spray the insufficiently sprayed region(s) again. Moreover, the controller 240 may operate the actuator(s) 222 to adjust the position of the nozzle 220 according to a different access course than that used in the previous spray operation in attempt to improve deposition and/or distribution of the spray material over the underlying part(s).

The controller 240 may repeat this re-spraying process in one or more additional iterations where in each iteration, the controller 240 may analyze the distribution of the spray material on the target underlying part(s) of the plant 202 and spray these part(s) again after adjusting the position of the nozzle 220.

Optionally, the controller 240 may operate one or more of the actuator 220 to adjust the position of one or more of the nozzle 2:20 using one or more ML models trained to learn, predict and/or estimate a correlation between nozzle positioning and distribution of the spray material over the one or more plants 202.

The ML model(s), for example, a neural network, a deep neural network, a Support Vector Machine (SVM), a classifier and/or the like may be trained to estimate and/or predict distribution patterns of the spray material over the plant 202 in correlation (dependence) to the position of the nozzle 220 with respect to the sprayed plant. Moreover, the ML model(s) may be trained to estimate and/or predict distribution patterns of the spray material over different parts of the plant 202, for example, one or more of the underlying parts of the plant 202.

The controller 240 may therefore operate the actuator(s) 222 to adjust the position of the nozzle 220 to bring it to a position estimated by the ML model(s) to produce (achieve) best distribution of the spray material over the plant 202, in particular over the underlying part(s) of the plant 202.

The ML model(s) may be trained in one or more supervised, unsupervised, and/or semi-supervised training sessions with a plurality of training samples associating between a plurality of positions of the nozzle 220 with respect to one or more plants 202 and coverage of the spray material over the plants sprayed by the nozzle 220 while positioned in the plurality of positions. Specifically, the ML model(s) may be trained using training samples associating between positions of the nozzle 220 with respect to one or more plants 202 of the type of the plant 202 targeted in the current spraying process.

For example, one or more of training samples may comprise spatial information of the nozzle 220 with respect to the plant 202, for example, distance, rotation angle, orientation angle, access angle, and/or the like and information relating to spray material coverage over the plant 202, specifically over the underlying part(s) of the plant 202, for example, coverage percentage, amount of spray material per square area, and/or the like. In another example, one or more of training samples may comprise images depicting the nozzle 220 with respect to the plant 202 while the nozzle 220 is operated to spray the spray material and images of the plant 202 captured after sprayed with the spray material and depict the distribution and/or coverage of the spray material over the plant 202. For example, the images depicting the distribution of the spray material may depict the coverage over one or more of the underlying parts of the plant 202. In another example, images depicting the distribution of the spray material may depict the coverage over the external part of the plant 202, for example, over its foliage from which the coverage over the underlying parts may be derived based on past observations, experiments, and/or measurements.

According to some embodiments of the present invention, the robotic sprayer 200 may be configured to combine pressure based spraying through the nozzle(s) 220 with air blowing technology to improve, increase, and/or enhance distribution of the sprayed material(s) over the targeted plant(s) 202.

To this end the robotic sprayer 200 may comprise one or more air spraying devices configured to produce air flows, blows, blasts, and/or bursts in order to further distribute the spray material sprayed, i.e., discharged and/or released under pressure from the nozzle(s) 220.

As described herein before, the spray material(s) may be discharged from the nozzle(s) 220 in the form of a pressurized jet of droplets. The controller 240 may thus operate one or more of the air spraying device(s) to generate an air flow in one or more blasts and/or bursts of air over the jet of droplets and form a cloud of droplets directed towards the plant(s) 202.

In order to create an effective cloud of droplets thus enhancing distribution of the spray material(s) over the targeted plant(s) 202, one or more properties of the droplets of the spray material(s) jet discharged from the nozzle(s) 220, for example, size, diameter, weight, and/or the like may be adjusted to enhance their (the droplets) distribution by the air spraying device(s).

For example, the nozzle(s) 220 may be designed, configured, adjusted and/or operated by the controller 240 to form and/or produce droplets having a certain size and/or diameter, for example, Volume Median Diameter (VMD) in a range of, for example, 145-225 microns, and/or the like such that the droplets may be effectively blown (driven) by the air spraying device(s) to enhance their distribution over the plant(s) 202.

Optionally, one or more of the air spraying device(s) may be moveable by one or more of the actuator(s) 222 of the robotic sprayer 200 which may be operated to adjust a position of the air spraying device(s) in order to change, adjust, and/or adapt the direction of their air flow and thus the direction, formation, shape and/or speed of the cloud of droplets of the spray material(s) directed towards the plant(s) 202. For example, one or more of the air spraying device(s) may be mechanically coupled to one or more mechanical arm elements which are moveable, rotatable and/or extendable in one or more spatial axes by one or more of the actuator(s) 222 thus enabling movement of their attached air spraying device(s).

The controller 204 may operate the nozzle(s) 220 and the air spraying device(s) to create and/or form the cloud of droplets of the spray material such that is may distribute over the plant(s) 202 with no specific focus. In case of plants 202 having a thin foliage, the spray material(s) may penetrate through the thin foliage distribute over the entire plant 202 including its underlying parts. However, in case of high density foliage plants 202, the spray material(s) may mainly distribute over the outer leaves of the plant 202 and only little and potentially ineffective amount of the spray material(s) may penetrate through the foliage and reach the underlying parts of the plants 202.

The controller 240 may therefore optionally adjust the position of the nozzle(s) 220 and further a position of the air spraying device(s) according to the access course(s) identified according to the process 100 in order to effectively distribute the spray material(s) over the underlying part(s) of the targeted plant(s) 202.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms spray material, image analysis, and ML model are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A robotic sprayer for optimizing application of crop related materials, comprising:
   at least one imaging sensor;
   at least one nozzle configured for spraying at least one material;
   at least one actuator configured for moving the at least one nozzle; and
   at least one controller configured for:
      receiving imagery data captured by the at least one imaging sensor depicting at least one plant,
      computing a foliage model modeling a foliage of the at least one plant based on analysis of the imagery data,
      identifying, based on analysis of the foliage model, at least one access course to at least one underlying part of the at least one plant which is at least partially covered by the foliage;
      operating the at least one actuator to adjust in real-time a position of the at least one nozzle according to the at least one access course;
      operating the at least one nozzle to spray the at least one material over the at least one underlying part; and
   wherein the at least one controller is further configured to operate the at least one actuator to adjust the position of the at least one nozzle using at least one machine learning model trained to learn a correlation between nozzle positioning and disposition of the at least one material over the at least one plant, wherein the at least one machine learning model is trained with a plurality of training samples associating between a plurality of positions of the at least one nozzle with respect to the at least one plant and coverage of the at least one material over the at least one plant sprayed by the at least one nozzle while positioned in the plurality of positions.

2. The robotic sprayer of claim 1, further comprising at least one air blowing device, and the at least one controller is further configured for operating the at least one air blowing device to produce an air flow directed to the foliage in at least one blast to form at least one access course to the at least one underlying part.

3. The robotic sprayer of claim 2, wherein the at least one controller is further configured for operating the at least one air blowing device based on analysis of the foliage model.

4. The robotic sprayer of claim 1, wherein the at least one controller is further configured for operating the at least one actuator to adjust the position of the at least one nozzle according to a deposition of the at least one material over the at least one underlying part, the deposition is identified based on analysis of imagery data of the at least one plant captured by the at least one imaging sensor when sprayed with the at least one material.

5. The robotic sprayer of claim 1, further comprising at least one position sensor configured to measure a position of the at least one nozzle with respect to at least one reference point of the robotic sprayer, the at least one controller is further configured for operating the at least one actuator to adjust the position of the at least one nozzle according to nozzle position data captured by the at least one position sensor.

6. The robotic sprayer of claim 1, wherein the at least one controller is configured to operate the at least one actuator to adjust the position of the at least one nozzle according to at least one positioning rule which defines at least one of: a distance, an orientation, and an access angle.

7. The robotic sprayer of claim 1, wherein the at least one controller is configured to operate the at least one nozzle according to at least one spraying rule which defines at least one of: a type of the at least one material, an amount of the at least one material, a spray pressure, and a spray angle.

8. The robotic sprayer of claim 1, wherein the at least one controller is further configured for operating the at least one actuator to adjust the position of the at least one nozzle according to at least one environmental condition.

9. The robotic sprayer of claim 1, wherein the at least one nozzle is configured to spray the at least one material using at least one spraying mechanism, the at least one spraying mechanism is a member of a group consisting of: air pressure and hydraulic pressure.

10. The robotic sprayer of claim 1, further comprising at least one air spraying device configured to further distribute the at least one material sprayed by the at least one nozzle.

11. The robotic sprayer of claim 10, wherein at least one property of droplets of the at least one material sprayed by the at least one nozzle is adjusted for enhanced distribution by the at least one air spraying device.

12. The robotic sprayer of claim 10, wherein the at least one controller is further configured for operating the at least one actuator to adjust a position of the at least one air spraying device.

13. The robotic sprayer of claim 1, further comprising at least one light source configured to project light on the at least one plant in at least one light spectral region.

14. The robotic sprayer of claim 13, wherein the at least one controller is further configured for operating the at least one actuator to adjust a position of the at least one light source.

15. The robotic sprayer of claim 1, wherein the at least one nozzle is mounted on at least one arm element moveable by the at least one actuator.

16. The robotic sprayer of claim 1, wherein the at least one imaging sensor is a member of a group consisting of: a camera, an infrared sensor, a laser imaging detection and ranging (LiDAR) sensor, an ultrasonic sensor, a thermal imaging sensor, a sound navigation and ranging (SONAR) sensor, and a radio detection and ranging (RADAR) sensor.

17. The robotic sprayer of claim 1, wherein the at least one material is a member of a group consisting of: a fertilizer, an herbicide, and a pesticide.

18. A method of adjusting automatically a robotic sprayer for optimizing application of crop related materials, comprising:
using at least one controller of the robotic sprayer for:
receiving imagery data depicting at least one plant which is captured by at least one imaging sensor of the robotic sprayer,
computing a foliage model modeling a foliage of the at least one plant based on analysis of the imagery data,
identifying, based on analysis of the foliage model, at least one access course to at least one underlying part of the at least one plant which is at least partially covered by the foliage;
operating the at least one actuator of the robotic sprayer to adjust in real-time a position of the at least one nozzle of the robotic sprayer according to the at least one access course
operating the at least one nozzle to spray at least one material over the at least one underlying part; and
wherein the at least one controller operates the at least one actuator to adjust the position of the at least one nozzle using at least one machine learning model trained to learn a correlation between nozzle positioning and disposition of the at least one material over the at least one plant, wherein the at least one machine learning model is trained with a plurality of training samples associating between a plurality of positions of the at least one nozzle with respect to the at least one plant and coverage of the at least one material over the at least one plant sprayed by the at least one nozzle while positioned in the plurality of positions.

* * * * *